(12) United States Patent
Arambepola et al.

(10) Patent No.: US 10,742,264 B2
(45) Date of Patent: Aug. 11, 2020

(54) SIGNALING METHOD FOR INTERFERENCE GROUP DISCOVERY IN CABLE MODEMS

(71) Applicant: Intel Corporation, Santa Clara, CA (US)

(72) Inventors: Bernard Arambepola, Enfield (GB); Thushara Hewavithana, Hatfield (GB); Noam Tal, Givataim (IL); Shaul Shulman, Ramat Gan (IL)

(73) Assignee: Intel Corporation, Santa Clara, CA (US)

( * ) Notice: Subject to any disclaimer, the term of this patent is extended or adjusted under 35 U.S.C. 154(b) by 123 days.

(21) Appl. No.: 15/475,448

(22) Filed: Mar. 31, 2017

(65) Prior Publication Data
US 2018/0287660 A1    Oct. 4, 2018

(51) Int. Cl.
| | |
|---|---|
| *H04B 3/46* | (2015.01) |
| *H04B 3/32* | (2006.01) |
| *H04B 3/487* | (2015.01) |
| *H04N 21/61* | (2011.01) |
| *H04L 12/28* | (2006.01) |
| *H04L 12/26* | (2006.01) |
| *H04B 17/345* | (2015.01) |
| *H04L 5/00* | (2006.01) |

(52) U.S. Cl.
CPC ............... *H04B 3/46* (2013.01); *H04B 3/32* (2013.01); *H04B 3/487* (2015.01); *H04B 17/345* (2015.01); *H04L 12/2801* (2013.01); *H04L 12/2856* (2013.01); *H04L 43/50* (2013.01); *H04N 21/6168* (2013.01); *H04L 5/0007* (2013.01)

(58) Field of Classification Search
CPC .. H04J 14/086; H04J 3/1694; H04B 10/0793; H04B 15/00; H04B 17/24; H04L 5/14; H04W 72/0453
USPC .................... 370/252, 461; 398/36
See application file for complete search history.

(56) References Cited

U.S. PATENT DOCUMENTS

| | | | |
|---|---|---|---|
| 6,650,624 B1 | 11/2003 | Quigley et al. | |
| 7,103,065 B1 | 9/2006 | Quigley et al. | |
| 9,966,993 B2* | 5/2018 | Jin ................. | H04B 3/32 |
| 2002/0061012 A1* | 5/2002 | Thi ................. | H04B 3/23 |
| | | | 370/352 |

(Continued)

FOREIGN PATENT DOCUMENTS

EP            2938095 A1    10/2015

OTHER PUBLICATIONS

European Search Report dated Jun. 8, 2018 in connection with European Patent Application EP 18 15 5636, p. 1-7.

*Primary Examiner* — Melanie Jagannathan
(74) *Attorney, Agent, or Firm* — 2SPL Patent Attorneys PartG mbB

(57) ABSTRACT

A cable modem system for discovering interference groups (IGs) includes an infrastructure and a cable modem termination system (CMTS). The infrastructure is for transferring data. The CMTS is configured to initiate generation of test signals by a set of cable modems (CMs), obtain a set of test measurements for the set of CMs, discover interference groups (IGs) of the set of CMs based on the obtained set of test measurements and assign a plurality of upstream and downstream channels for the set of CMs that use orthogonal frequency division multiplexing (OFDM) based on the discovered IGs.

14 Claims, 6 Drawing Sheets

(56) References Cited

U.S. PATENT DOCUMENTS

| | | | |
|---|---|---|---|
| 2004/0073937 A1* | 4/2004 | Williams | H04N 17/00 |
| | | | 725/107 |
| 2014/0010269 A1 | 1/2014 | Ling et al. | |
| 2014/0133330 A1 | 5/2014 | Chapman | |
| 2015/0043520 A1* | 2/2015 | Sun | H04L 5/001 |
| | | | 370/330 |
| 2016/0072578 A1* | 3/2016 | Jin | H04J 14/086 |
| | | | 398/36 |
| 2017/0019239 A1* | 1/2017 | Jin | H04L 1/004 |
| 2017/0019241 A1 | 1/2017 | Jin et al. | |
| 2018/0076910 A1* | 3/2018 | Zhang | H04B 17/24 |

\* cited by examiner

SIGNALING METHOD FOR INTERFERENCE GROUP DISCOVERY IN CABLE MODEMS

FIELD

The present disclosure relates to cable modems (CMs) and interference discovery for cable modems.

BACKGROUND

A cable modem (CM) is a type of network device or modem that provides data communication by radio frequency channels on a hybrid fibre coax (HFC) and/or radio frequency over glass (RFoG) infrastructure.

Cable modems utilize the HFC and RFoG networks to deliver high bandwidth broadband internet access. The cable modems provide relatively low cost internet access at relatively high speeds.

A number of cable modems typically share the HFC and/or RFoG infrastructure with a limited number of channels and frequencies. Interference can occur when multiple cable modems attempt to utilize the same channel(s). This interference can degrade or disrupt the broadband internet access. The interference can include upstream to downstream interference.

BRIEF DESCRIPTION OF THE DRAWINGS

Some examples of circuits, arrangements, apparatuses and/or methods will be described in the following by way of example only. In this context, reference will be made to the accompanying Figures.

DETAILED DESCRIPTION

Figure 1A:
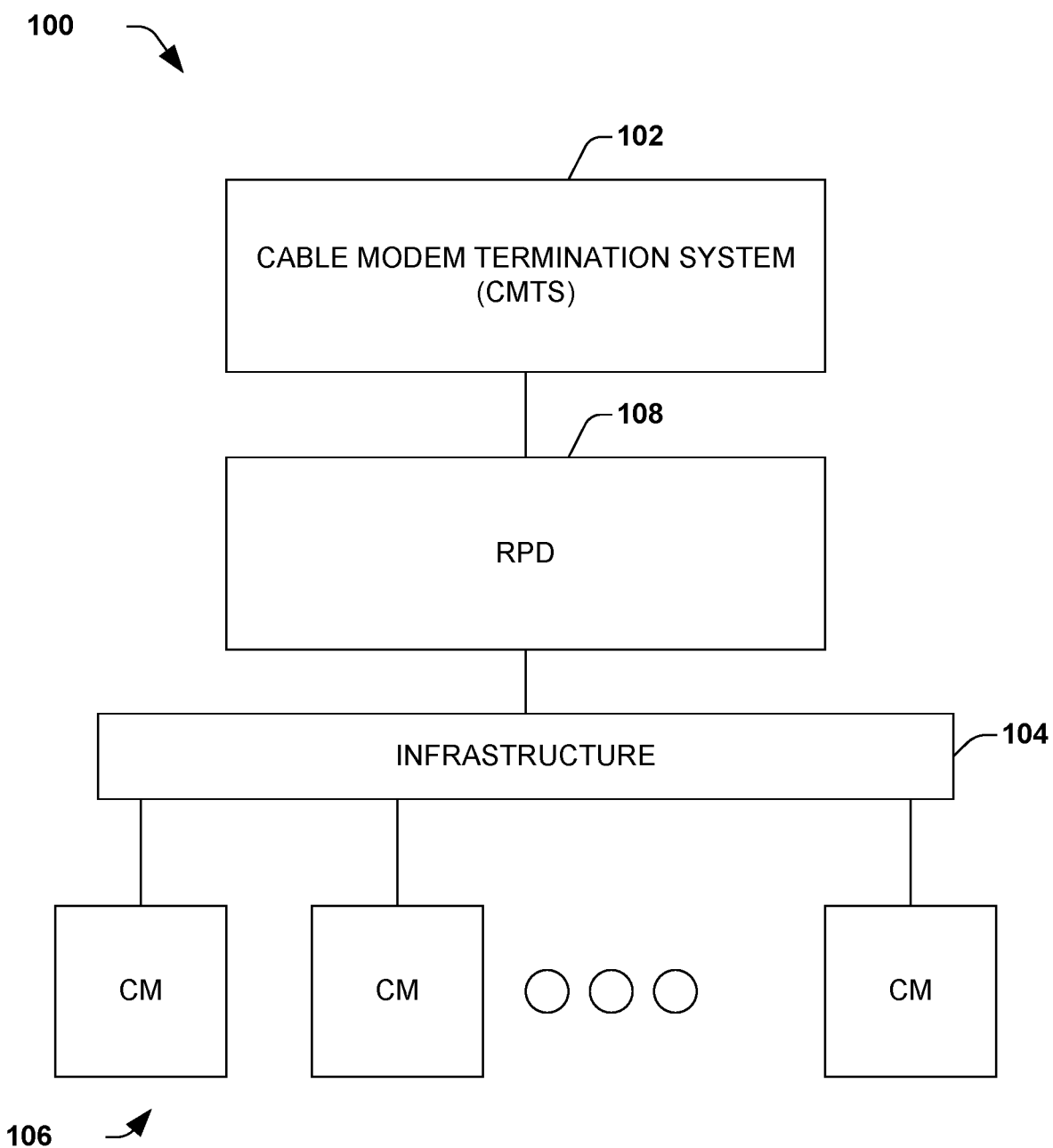
FIG. 1A is a diagram illustrating a DOCSIS cable modem (CM) system for high speed broadband communications in accordance with an embodiment.

The present disclosure will now be described with reference to the attached drawing figures, wherein like reference numerals are used to refer to like elements throughout, and wherein the illustrated structures and devices are not necessarily drawn to scale.

As utilized herein, terms "component," "system," "interface," "circuit" and the like are intended to refer to a computer-related entity, hardware, software (e.g., in execution), and/or firmware. For example, a component can be a processing circuit (e.g., a microprocessing circuit, a controller, or other processing device), a process running on a processing circuit, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processing circuits. The one or more processing circuits can be internal or external to the apparatus and can execute at least a part of the software or firmware application. As yet another example, a component can be an apparatus that provides specific functionality through electronic components without mechanical parts; the electronic components can include one or more processing circuits therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

In the following description, a plurality of details is set forth to provide a more thorough explanation of the embodiments of the present disclosure. However, it will be apparent to one skilled in the art that embodiments of the present disclosure may be practiced without these specific details. In other instances, well-known structures and devices are shown in block diagram form rather than in detail in order to avoid obscuring embodiments of the present disclosure. In addition, features of the different embodiments described hereinafter may be combined with each other, unless specifically noted otherwise.

Cable modems (CMs) utilize the HFC and RFoG networks to deliver high bandwidth broadband internet access. The cable modems provide relatively low cost internet access at relatively high speeds, such as about 42 Mbit/s per channel for orthogonal frequency division multiplexing (OFDM) with coded OFDM modulation.

A standard referred to as data over cable service interface specification (DOCSIS) is an international telecommunications standard that permits the addition of high-bandwidth data transfer to an existing cable television (CATV) system. The DOCSIS uses an infrastructure, such as the hybrid fibre coax (HFC) and/or radio frequency over glass (RFoG) to provide high bandwidth broadband internet access.

Each CM within a CM system or network is assigned one or more channels for CM communications by a cable modem termination system (CMTS). The channel assignment process can be performed via a process referred to as provisioning.

One type of communication for CMs utilizes half duplex communication. Thus, each CM is assigned or provisioned an upstream channel for upstream communication and a downstream channel for downstream communication. Unfortunately, this type requires two separate channels for communication by each CM. In current DOCIS system, both the CM and CMTS are operating in half-duplex mode meaning there is no simultaneous downstream and upstream communication on the same channel.

A next generation DOCSIS standard is based on full duplex (FDX) communication form CMTS point of view, where CMTS uses advanced echo cancellation to remove interference from downstream to upstream. Here upstream is the received signal at CMTS. However, any given CM typically uses half-duplex in this FDX system to avoid a CM's self upstream signals/transmission from interfering with its own downstream signals/transmission. FDX communication is achieved in system level by allowing another cable modem, which is sufficiently isolated from the given cable modem, to communicate upstream using a downstream channel of the given modem.

FIG. 1 is a diagram illustrating a DOCSIS CM system 100 for high speed broadband communications in accordance with an embodiment. The system 100 utilizes FDX communication, where an allocated channel can be used for both upstream and downstream communications or transmissions. The system 100 can be used with orthogonal frequency division multiplexing (OFDM) based CM communications, such as with DOCSIS 3.1. Additionally, the system 100 can use coded OFDM modulation.

For DOCSIS 3.1, OFDM is used and upstream and/or downstream signals include a plurality of tones. The number of tones can be, for example, hundreds or thousands. The tones used in the signals are generated to be orthogonal to mitigate interference with each other. Additionally, there is a fixed boundary in frequency between upstream and downstream signals. In one example, a mid-split configuration, upstream channels use frequencies below 85 MHz and downstream channels are assigned frequencies above 108 MHz. An in between frequency band, 85-108 MHz is used as a guard band. The guard band can be used as a transition band for implementing diplexer filters to isolate upstream and downstream signals.

The system 100 includes a cable modem termination system (CMTS) 102, an infrastructure 104, a plurality of cable modems (CMs) 106 and a remote physical device (RPD) 108.

The CMTS 102 is connected to a high capacity data link of a network service provider. The high capacity data link is typically connected to the Internet. The CMTS 102 is configured to enable communication via the high capacity data link for the plurality of CMs 106. In one example, the CMTS 102 is one of a plurality of CMTSs connected to a headend, which is in turn connected to the Internet via the high capacity data link. The CMTS 102 is configured to service a number of CMs, such as 100 CMs, less than 100 CMs and the like.

The remote physical (PHY) device (RPD) 108 can be connected to the CMTS 102 and acts as the head end. In one example, the RPD 108 and the CMTS 102 are separate components. In another example, the RPD 108 and the CMTS 102 are incorporated into the CMTS 102. The RPD 108 and the CMTS 102 are connected using a link, such as a digital fiber link.

The RPD 108 is configured to perform functions of the physical layer baseband and the radio frequency (RF) transmitter and receiver for the head end. The RPD 108 is also referred to as a node. The CMTS 102 is configured to perform medium access control (MAC) layer functions. The RPD 108 and the CMTS 102 can also collectively form the head end and can be referred to as CMTS.

The RPD 108 is also configured to implement self interference (SIC) mitigation to implement and/or facilitate FDX for the CMs 106. The SIC is directed and canceling out stronger downstream signals from upstream signals to an extent which allows upstream reception at the RPD 108. For the CMs 106, upstream and downstream signals/communication using FDX is permitted for CMs having low interference between CMs in different interference groups (IGs), as described below.

The CMTS 102 is coupled to an infrastructure 104 to provide a high speed connection to the plurality of CMs 106. The infrastructure 104 is a hybrid fibre coax (HFC) infrastructure in one example. In another example, the infrastructure 104 utilizes radio frequency over glass (RFoG). It is appreciated that other suitable types and/or materials can be used for the infrastructure 104. In one example, the CMTS 102 provides a fiber deep architecture.

For ease of explanation, the RPD 108 and the CMTS 102 can be collectively referred to as the CMTS. Thus, a reference to the CMTS can also include a reference to the RPD.

The CMTS 102 is configured to assign channels to the plurality of CMs 106. In one example, frequency bands between 108-684 MHz can be designated as 3 FDX channels of width 192 MHz each. For these channels or bands, there can be a single 192 MHz OFDM downstream signal in the downstream communication and two 96 MHz OFDM signals in the upstream communication.

The plurality of CMs 106 typically reside at subscribers of CM service. The CMs enable access to the Internet for the subscribers. The CMs 106 stream data in both upstream and downstream directions using upstream and downstream packets on a single, assigned channel. The assigned channel is typically an OFDM channel. The assigned channel can be configured for full duplex (FDX) communication.

The upstream data is typically carried in frames encapsulated inside DOCSIS frames using a suitable modulation, such as quadrature amplitude modulation (QAM), quadrature phase shift keying (QPSK), and the like. The modulation order, in one example, is 4096 QAM or 16384 QAM, however it is appreciated that other suitable modulation orders can be used.

The downstream data is also typically carried in frames encapsulated inside DOCSIS frames using a suitable modulation, such as quadrature amplitude modulation (QAM), quadrature phase shift keying (QPSK), and the like. The modulation order, in one example, is 4096 QAM or 16384 QAM, however it is appreciated that other suitable modulation orders can be used.

The CMTS 102 is configured to discover/partition the plurality of CMs 106 into one or more interference groups (IGs). An IG is a set of CMs where upstream signals of CMs interfere with each other's downstream reception. Generally, CMs within an IG interfere with each other, but there is none or low interference between interference between a CM and CMs for other IGs. Once the IGs are identified, The CMTS 102 is configured to schedule FDX upstream and downstream packets to CMs to prevent or mitigate collision of the packets in terms of frequency and/or time.

The CMTS 102 is configured to discover the IGs and update the IGs at various times and/or other criteria. The discovery is performed without interfering or substantially interfering current CM communications.

The discovery includes selecting a CM of the CMs 106 to transmit a test signal upstream over the infrastructure 104 and for other CMs of the CMs 106 to measure interference in downstream and send the interference measurement back to the CMTS 102. The CMs that receive the CM test signal and measure the interference are referred to as measuring CMs. The CMTS 102 is configured to discover/partition the plurality of CMs 106 into the one or more interference groups (IGs) based on the measured interference from the other CMs.

The transmission of the test signals is also referred to as a sounding process. The sounding process is associated with OFDM and OFDM signals. In one example, tones in an upstream OFDM signal are replaced with continuous wave (CW) tones for the testing CM. Other CMs, the measuring CMs of the CMs 106, observe and measure these tones in received downstream OFDM signals. The measurements include strength of the received downstream signals, such as an observed signal to noise ratio (SNR) of the tones.

As stated above, an interference group (IG) is a group of CMs that are discovered to cause interference with each other. The interference can be due to proximity to other CMs, location, and the like. The IG CMs can be considered noisy neighbors.

Once the IGs are discovered, the CMTS is configured to assign or allocate channels, including upstream and downstream channels to CMs 106 so that upstream communications/transmissions from CMs do not interfere or substantially interfere with downstream communications/transmissions of other CMs of the plurality of CMs 106. In one example, the CMTS 102 is configured to permit only one CM of an IG to transmit at the same time and the same frequency. The CMTS 102 can be configured schedule transmissions by the IGs to utilize available channels. In one example, the IGs are mapped using transmission groups (TGs) for scheduling.

Additional details on suitable techniques for generating the CM test signal, measuring the interference from the CM test signal and selecting the IGs based on the measured interference are provided below.

Figure 1B:
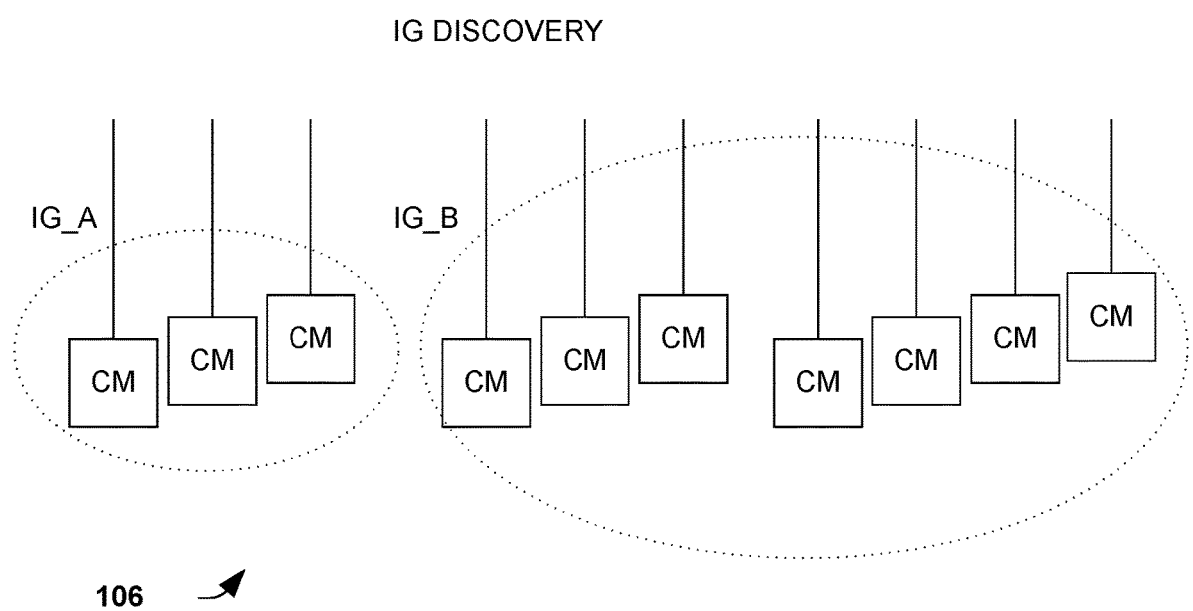
FIG. 1B is a diagram illustrating interference groups (IGs) for a DOCSIS CM system.

FIG. 1B is a diagram illustrating example interference groups (IGs) for a next generation DOCSIS CM system. The example can be used in conjunction with the system 100, described above.

The example includes a plurality of CMs 106. A CMTS has performed an interference discovery process to identify a plurality of interference groups (IGs). The plurality of IGs include IG_A and IG_B, as shown. It is appreciated that other IGs can be present.

For this example, it is assumed that a first CM in the IG_A uses channel CH_1 for downstream signals and downstream communication. Other CMs in IG_A are prevented from using CH_1 for upstream signals/communication by the CMTS, because the upstream communication would likely interfere with the downstream communication of the first CM. However, a second CM located in the IG_B can use CH_1 for upstream signals/communication, because the discover process indicates that the upstream communication by the second CM will not substantially interfere with the downstream communication by the first CM.

Figure 2:
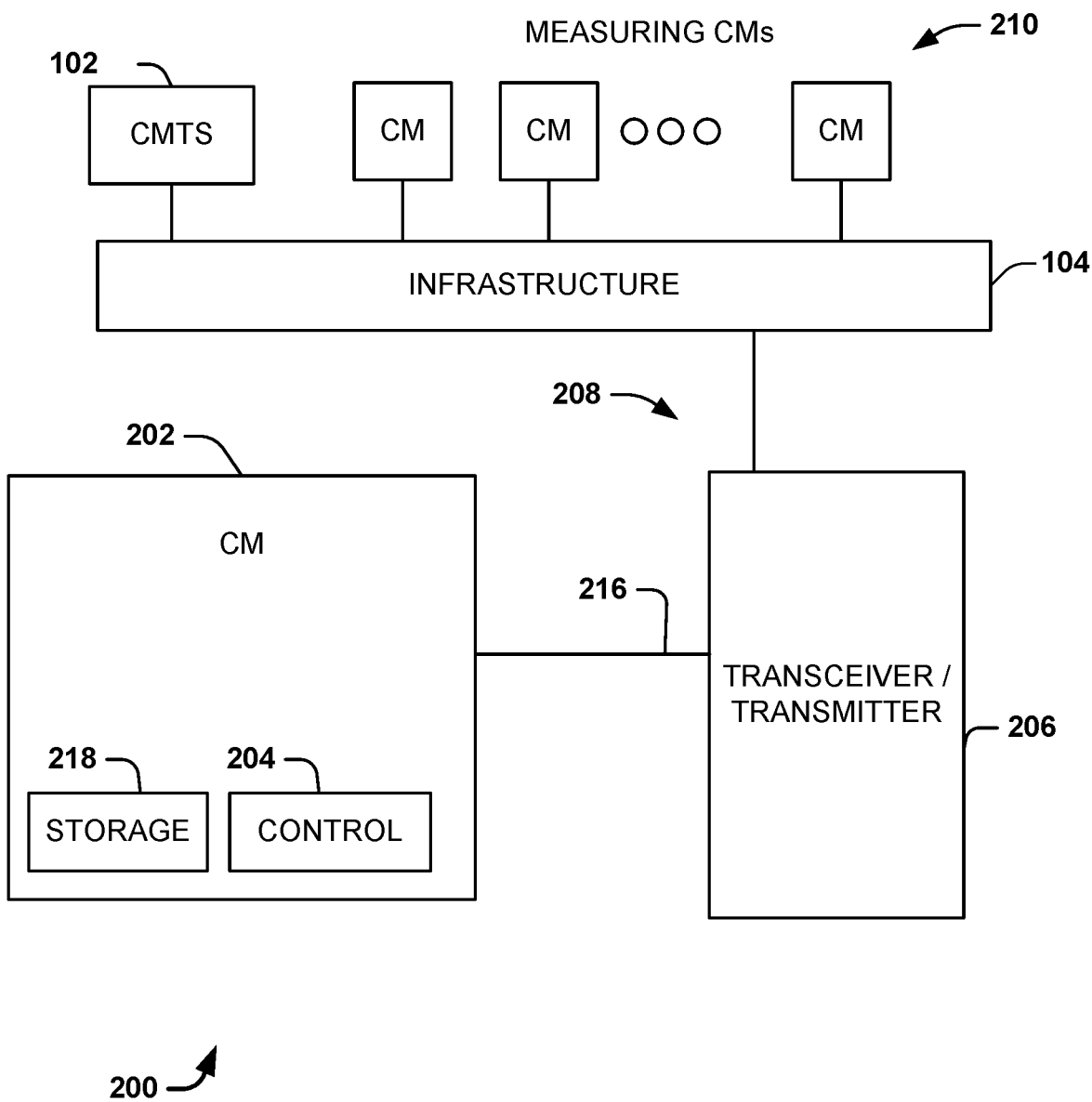
FIG. 2 is a diagram illustrating a cable modem (CM) arrangement for generating a CM test signal that facilitates discovery of CM interference groups (IGs).

FIG. 2 is a diagram illustrating a cable modem (CM) arrangement 200 for generating a CM test signal that facilitates discover of CM interference groups (IGs). The arrangement 200 is provided for illustrative purposes and it is appreciated that suitable variations. The arrangement 200 can be utilized with the system 100 and variations thereof.

The arrangement 200 includes a test cable modem (CM) 202, the infrastructure 104, a plurality of measuring CMs 210 and the cable modem termination system (CMTS) 102. The CMTS 102 has selected or assigned the CM 202 to generate a test signal to be used in discovery of interference groups (IGs). The CMTS 102 has also selected or assigned plurality of measuring CMs 210 to measure the test signal generated by the CM 202 and transmit the CM test signal measurements to the CMTS 102. The CMTS 102 is configured to discover or partition the CMs 210 into one or more IGs.

The infrastructure 104 is a hybrid fibre coax (HFC) infrastructure in one example. In another example, the infrastructure 104 utilizes radio frequency over glass (RFoG). It is appreciated that other suitable types and/or materials can be used for the infrastructure 104.

The CM 202 includes a transceiver 206, a storage component 218, and control circuitry or controller 204. The storage component 218 includes a memory, storage element and the like and is configured to store information for the CM 202. The controller 204 is configured to perform various operations associated with the CM 102. The controller 204 can include logic, components, circuitry, one or more processors and the like. The transceiver 206 includes transmitter functionality and receiver functionality. The CM 202 also includes one or more interfaces 208 for communications using the infrastructure 104.

The measuring CMs 210 also typically include a transceiver, a storage component, and control circuitry or controller. The storage component includes a memory, storage element and the like and is configured to store information for the CMs 210. The controller is configured to perform various operations associated with each CM 210. The controller can include logic, components, circuitry, one or more processors and the like. The transceiver includes transmitter functionality and receiver functionality. The CMs 210 can also include one or more interfaces for communications with the CM 202 via the infrastructure 102.

The CMTS 102, in this example, includes a transceiver, a storage component, and control circuitry or controller. The CMTS 102 is configured to enable communication to the Internet via a high capacity data link for CM 202 and the measuring CMs 210. In one example, the CMTS 102 is one of a plurality of CMTSs connected to a headend, which is in turn connected to the Internet via the high capacity data link. The CMTS 102 is configured to service a relatively large number of CMs, such as 4,000 to 50,000 CMs and the like. In fiber deep deployment, the number of CMs connected to the CMTS 102/RPD 108 may be less than 100.

The storage component of the CMTS 102 includes a memory, storage element and the like and is configured to store information for the CMTS 102. The controller is configured to perform various operations associated with the CMTS 102. The controller can include logic, components, circuitry, one or more processors and the like. The transceiver includes transmitter functionality and receiver functionality. The CMTS 102 also includes one or more interfaces for communications using the infrastructure 104.

As shown above, the CMTS 102 is configured to assign the CM 202 to generate a test signal to be used in discovery of interference groups (IGs). The CM 202 is selected based on test signal criteria, such as location of the CM 202, estimated interferences and the like.

The CMTS 102 is also configured to select the measuring CMs 210 to measure the test signal generated by the CM 202. In one example, the measuring CMs 210 are selected as a portion and/or all of the CMs services by the CMTS 102. The CMTS 102 is also configured to receive the test signal measurements from the CMs 210 and discover one or more IGs of CMs based on the received test signal measurements. This discovery process can be performed periodically, based on need, during provisioning of CMs, and the like.

An example of a suitable technique for generating a CM test signal by a CM, such as the CM 202 is shown below. The CM test signal includes continuous wave (CW) tones that replace one or more subcarriers of an upstream communication/transmission. Frequency location of CW tones aligned to downstream OFDM sub-carrier grid within a small frequency offset as described below.

Let the subcarrier frequencies of a OFDM downstream transmission be:

$\{kf_s, \text{ for } -K \leq k \leq K\}$

The $f_s$ is a subcarrier spacing. A small subset S of these subcarriers is selected for IG discovery other subcarriers can continue to be used in normal upstream and down-stream data communication. The CM test signal is transmitted on the S test subcarriers for the cable modem under test, say $CM_0$:

$$\Sigma_{k \in S} A \exp(j2\pi(kf_s + \Delta f)t + j\theta_k) \qquad \text{Eq. (1)}$$

Where t is time, and $\Delta f \ll f_s$ is a frequency offset that is significantly smaller than the subcarrier spacing in order to mitigate the impact of this test signal on normal data subcarriers. $\theta_k$ is a random phase angle and A is tone amplitude.

DOCSIS cable modems estimate a downstream frequency response as well as the background noise in a specific subcarrier frequency using scattered pilots. The scattered pilots repeat every 128 symbols. The testing CM knows the modulation associated with scattered pilots. Therefore, after removing this modulation, the CM can average scattered pilots $X_i(k)$ to get the frequency response H(k) of that subcarrier. Similarly, the variance gives the background noise power N(k) of that subcarrier. From this the CM can determine the SNR:

$$SNR(k) = \frac{|H(k)|^2}{N(k)} = \frac{|\text{mean}(X_i(k))|^2}{\text{var}(X_i(k))} \qquad \text{Eq. (2)}$$

The CM under test transmits its test signal of equation (1). Then the signal received by another or measuring CM on subcarrier k is:

$X_i(k) = H(k) + n_i(k) + A \exp(j\Phi)$ where $n_i(k)$ is the background noise sample.

The third term on the left hand side is the contribution of the test signal. In the next scattered pilots, this will be:

$X_{i+1}(k) = H(k) + n_i(k) + A \exp(j\Phi + j2\pi\Delta fT)$

Here T is the time separation between scattered pilots. $T = 128*(T_s + T_{CP})$, where $T_s = 1/f_s$ and $T_{CP}$ is the cyclic prefix duration. There is no additional phase contribution due to $kf_s$ component of frequency in equation (1). This is because $$T_{CP} = \frac{mT_s}{128}$$

for integer m for DOCSIS standard and therefore phase rotation due to $kf_s$ is $$2\pi kf_s * 128\left(T_s + \frac{mT_s}{128}\right) = 2\pi k(128 + m),$$

which is an integer multiple of $2\pi$.

The frequency offset $\Delta f$ of our proposed test signal is selected to satisfy the following equation:

$$2\pi \Delta fT = \pi \qquad \text{Eq. (3)}$$

$$\Delta f = \frac{1}{2T}$$

The effect of this choice on the measurement by a CM on a sequence of downstream scattered pilots on subcarrier k is as follows:

$X_i(k) = H(k) + n_i(k) + A \exp(j\Phi)$ $X_{i+1}(k) = H(k) + n_{i+1}(k) - A \exp(j\Phi)$ $X_{i+2}(k) = H(k) + n_{i+2}(k) + A \exp(\Phi)$ A third term in the left hand side (which is the interference cause by $CM_0$) alternates in sign from one scattered pilot to the next. Thus, this term does not contribute to the mean. Therefore the channel frequency response remains unchanged. However, this interference term contributes fully to the noise measurement:

$$N_k = \text{var}(n_i(k)) + |A|^2 \qquad \text{Eq. (4)}$$

The first term of the above equation is the background noise without interference (which is usually very small) and the second term is the interference.

$$SNR(k) = \frac{|H(k)|^2}{N(k) + |A|^2} \qquad \text{Eq. (5)}$$

By comparing with SNR measurement provided earlier (i.e. before the test signal is introduced), the measuring CM can measure the interference at this CM due to the test signal introduced by $CM_0$.

In one example, the frequency offset $\Delta f$ for 4K FFT and CP size of 256 samples that are used, which is typical in DOCSIS.

$$\Delta f = \frac{1}{2T} = \frac{1}{2*128*(4096+256)/204800000} = 184 \text{ Hz}$$

The subcarrier spacing is 50000 Hz. Hence, the frequency offset is 184 Hz and is a very small fraction of subcarrier spacing. Therefore, the proposed test signal introduced by $CM_0$ does not significantly or substantially impact data subcarriers surrounding the set of S test subcarriers. The test signal can be at the inter-carrier-interference (ICI) level at the adjacent subcarrier is −45 dB. Thus, normal or standard data communication can proceed unimpeded during the test.

Δf can be further reduced to lessen the impact on the data subcarriers further. For this:

$$2\pi \Delta f T = \pi/2$$

$$\Delta f = \frac{1}{4T}$$

This results in the following:

$$X_i(k) = H(k) + n_i(k) + A \exp(j\Phi)$$

$$X_{i+1}(k) = H(k) + n_{i+1}(k) + A \exp(j\Phi)$$

$$X_{i+2}(k) = H(k) + n_{i+2}(k) - A \exp(j\Phi)$$

$$X_{i+3}(k) = H(k) + n_{i+1}(k) - A \exp(j\Phi)$$

For these formulas, the mean value of the third term of the equation tends to zero over a longer period. The frequency offset now is only about 92 Hz and hence the inter-carrier-interference on data subcarriers surrounding the test subcarrier is even smaller; the ICI level at adjacent subcarrier is −50 dB. It is appreciated that the values shown above are for illustrative purposes and that other suitable values can be used.

Figure 3:
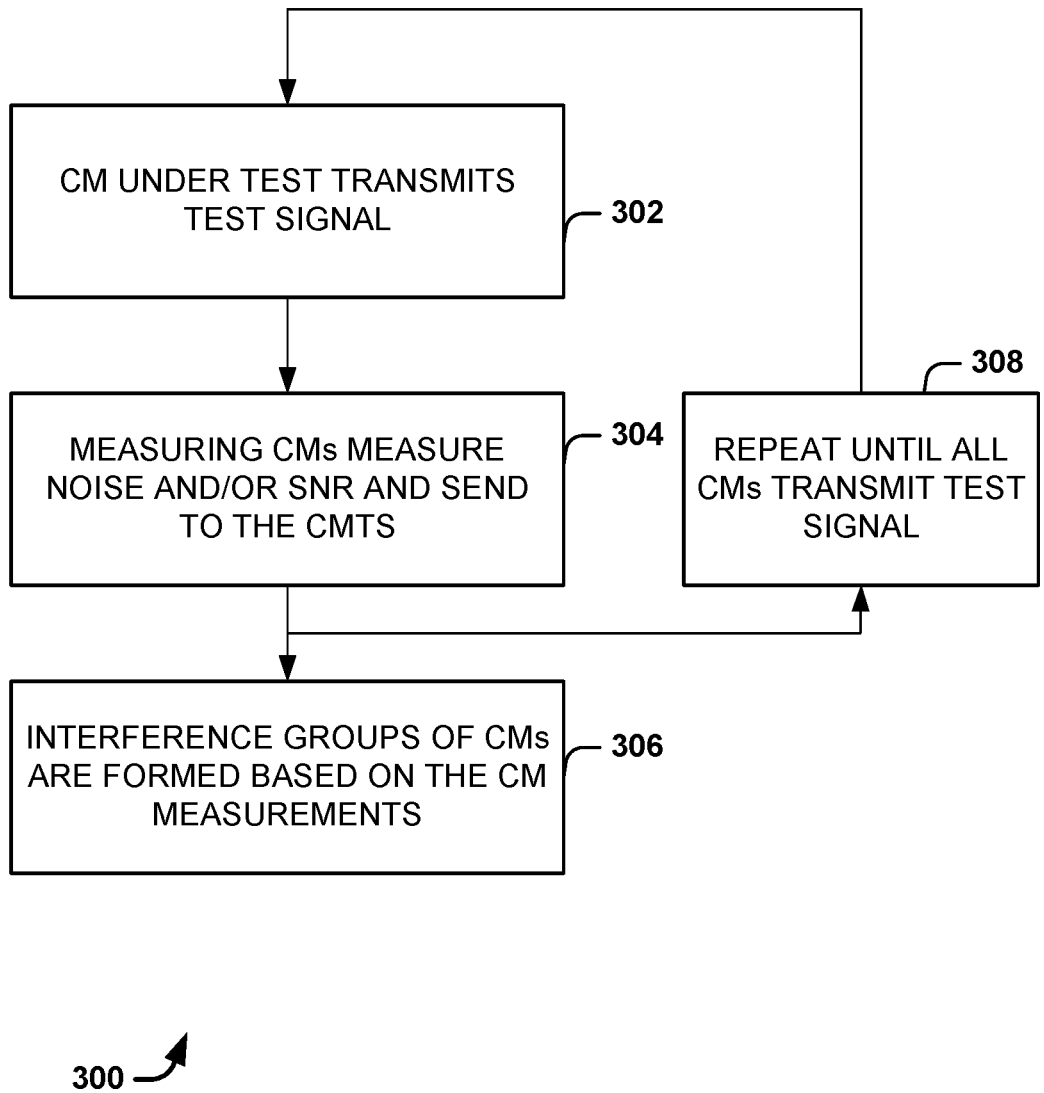
FIG. 3 is a flow diagram illustrating a method for forming interference groups (IGs) using CM generated test signals.

FIG. 3 is a flow diagram illustrating a method 300 for forming interference groups (IGs) using CM generated test signals. The method 300 can be controlled and/or conducted by a cable modem termination system (CMTS). The method 300 can be implemented utilizing the system 100, the arrangement 200, and variations thereof.

A CM under test generates a test signal at block 302. The CM under test, such as the CM 202, generates a suitable signal as the test signal, such as a signal generated by the above equation (1). It is appreciated that other suitable test signals can also be used.

The CMTS selects or assigns the CM under test from a set of CMs. Typically, the set of CMs are CMs served by the CMTS.

A plurality of measuring CMs obtain a plurality of test measurements based on the CM test signal at block 304. The measuring CMs are CMs are served by the CMTS. The test measurements include noise and signal to noise ratio (SNR). The plurality of measuring CMs can include, for example, the measuring CMs 210, described above.

In one example, the measuring CMs use equation (5), described above, to obtain the test measurements. The SNR measurement of equation (5) is compared with an earlier SNR measurement to measure the interference due to the test signal generated at 302.

The plurality of measuring CMs are CMs of the set of CMs, except the CM under test.

The plurality of test measurements are associated with individual CMs of the plurality of measuring CMs.

At block 308, the blocks 302 and 304 are repeated until all or a selected number of CMs have been the CM under test. Thus, for each repetition, the CMTS selects a different CM to be the CM under test.

Once all the CMs or the selected number of CMs have been the CM under test, the CMTS forms or discovers one or more interference groups based on the plurality of test measurements for each of the CMs that generated test signals. Thus, there is a set of test measurements that includes a plurality of test measurements for each CM of the set.

The CMTS partitions or discovers IGs based on the set of test measurements at block 306. The CMs within an IG interfere with each other, such as beyond an interference threshold value. Further, CMs in different IGs have none or an interference below a threshold value with each other.

Figure 4:
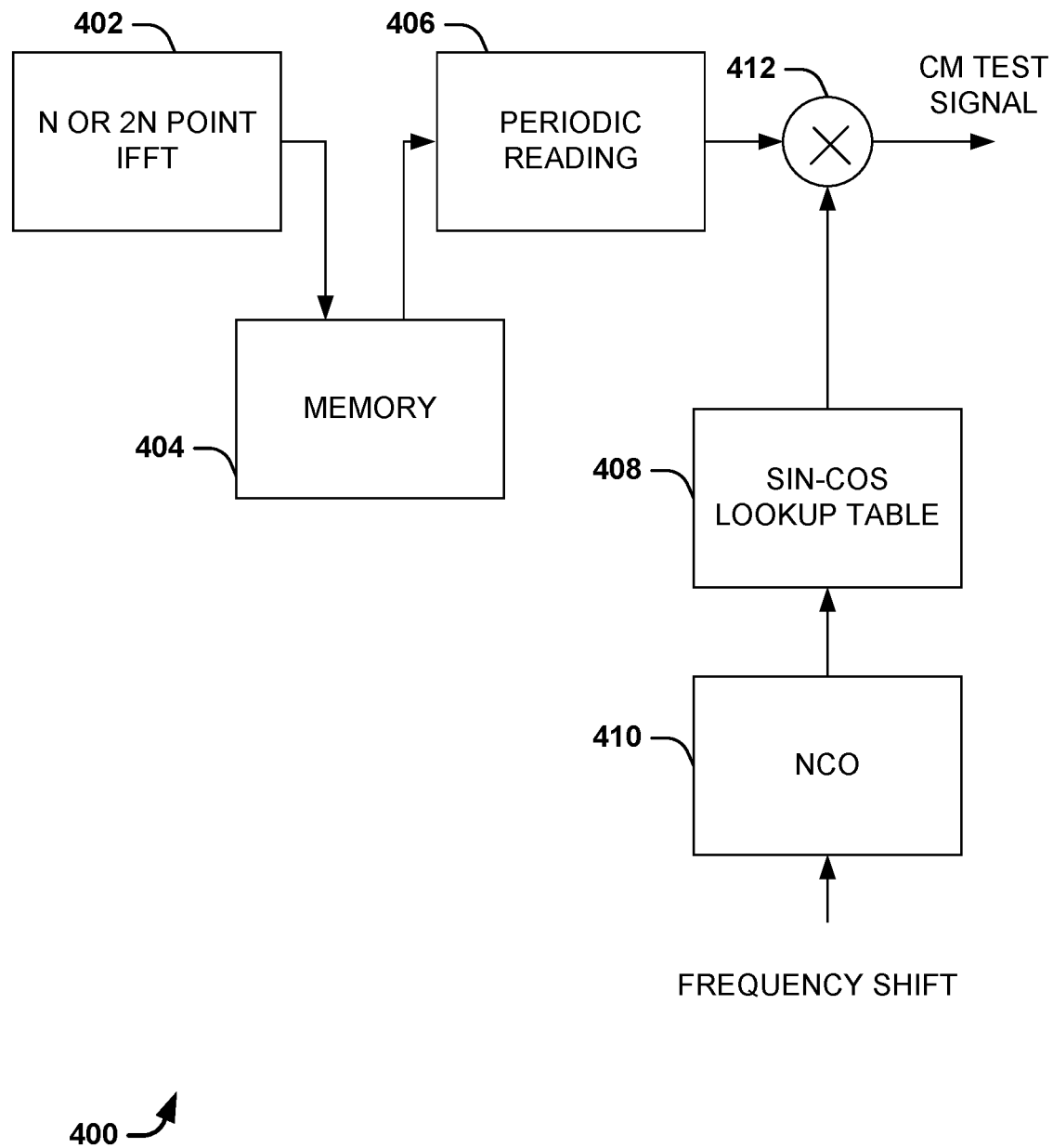
FIG. 4 is a diagram illustrating an arrangement for generating a CM test signal in accordance with an embodiment.

FIG. 4 is a diagram illustrating an arrangement 400 for generating a CM test signal in accordance with an embodiment. The test signal can be used in the method 300 and/or the arrangements and systems described above. It is appreciated that other suitable test signals can be used instead of or in addition to the test signal described with regard to FIG. 4.

The arrangement 400 can include one or more apparatuses, circuitry, processors, memory and the like. The arrangement 400 can be implemented in a CM, such as the CM 202 described above. The arrangement 400 generates a test signal that can be utilized to discover or partitions CMs into interval groups (IGs).

The arrangement 400 includes a sequence generator 402, a memory 404, a reading circuit 406, a lookup table 408, a mixer 412 and a numerically controlled oscillator (NCO) circuit 410.

A vector of length N, where N is the OFDM FFT size, is defined as:

$u_k = \exp(j\theta_k)$, for $k \in S$, and $u_k = 0$ for all other k.

where S is the set of test subcarriers given in equation (1).

The sequence generator 402 generates an N or 2N point invers fast Fourier transform (IFFT) based on the vector of length N. A 2N-point IFFT can be used instead of the N-point IFFT to get a set of more finely sampled sequence in the time domain. The set S and the phase angles $\{\theta_k\}$ are known beforehand. Thus, the N or 2N point IFFT may be pre-computed and stored in the memory or buffer 404.

The memory 404 is a storage element, memory, buffer and the like and is configured to store or buffer the sequence generated by the sequence generator 402.

The reading circuit 406 is configured to periodically supply the sequence from the memory 404. The supplied sequence is provided to the mixer 412.

The NCO circuit 410 receives or obtains a frequency shift or frequency offset. The NCO circuit 410 generates an output phase by integrating (accumulating) the obtained frequency offset. The lookup table 408 uses the phase output from the NCO circuit to lookup sine and cosine values to generate a complex phasor term.

The mixer 412 is configured to combine the complex phasor term with the supplied sequence(s). Thus, the mixer 412 modulates complex data sequences with the phasor output from the lookup table 408 to apply the frequency shift to the data sequences and generate the CM test signal as its output.

Figure 5:
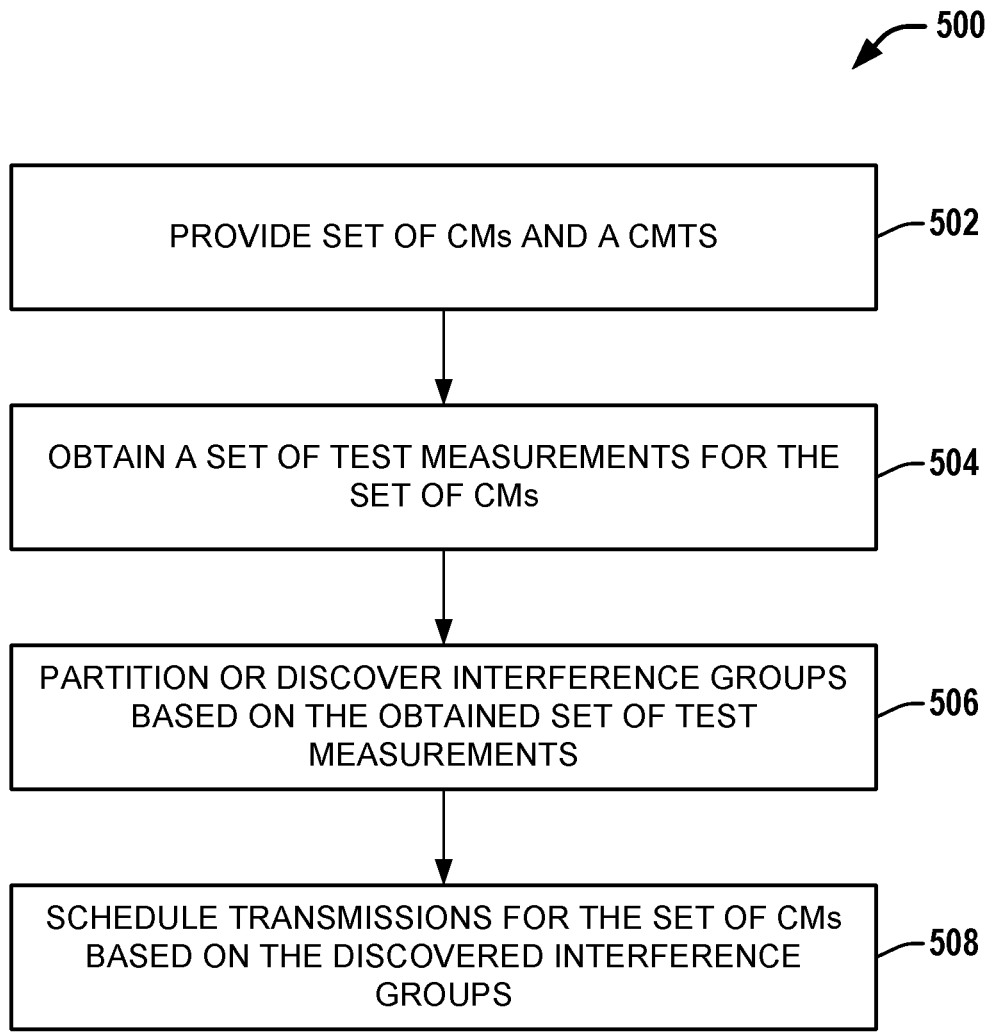
FIG. 5 is a flow diagram illustrating a method that facilitates discover of CM interference groups (IGs) in accordance with an embodiment.

FIG. 5 is a flow diagram illustrating a method 500 that facilitates discover of CM interference groups (IGs) in accordance with an embodiment. The method 500 can be used with the system 100, the arrangement 200 and variations thereof.

The method 500 begins at block 502, where a set of CMs and an associated CMTS are provided. The set of CMs include a plurality of CMs served by the CMTS. The CMTS is coupled to an infrastructure, such as HFR or RFoG, and a high speed data connect for the CMs. The CMTS typically includes or is associated with a remote physical device (RPD). The CMTS and/or the RPD can be configured to perform MAC and PHYS layer functions.

The CMTS and/or the RPD can also perform self interference (SIC) mitigation which can cancel out stronger downstream signals from an upstream signal.

The CMTS obtains a set of test measurements for the set of CMs at block 504. The set of test measurements is obtained by setting each of the CMs of the set of CMs as a CM under test. The CM under test generates a test signal, such as the test signal shown by equation (1). The test signal, in one example, is generated by replacing tones of an upstream OFDM signal with continuous wave (CW) tones.

Measuring CMs obtain measurements based on the test signal. In one example, measuring CMs connected to the RPD and/or the CMTS observe a signal to noise ratio based on the inserted tones/test signal in a downstream signal. The measurements are obtained, in one example, by at least partially by comparing measurements of the test signal with measurements of pilot signals.

The set of test measurements includes a plurality of test measurements associated with each of the CMs in the set of CMs.

The CMTS partitions or discovers IGs for the set of CMs at block 506 based on the obtained set of test measurements. The partitioning or discovery involves classifying the set of CMs into groups so that CMs in the same IG interfere with each other beyond or above a threshold value. Thus, as an example, a first CM from a first IG and a second CM from a second IG do not substantially interfere with each other.

The CMTS schedules transmissions for the set of CMs based on the discovered IGs at block 508. The scheduling can include channels/frequency and timing. The scheduling mitigates interference from the CMs based on the discovered IGs. The scheduling can also including assigning channels for upstream and downstream communications to the set of CMs.

The scheduling permits FDX communication by allowing CMs from a different IG to use a downstream channel of a CM for upstream transmissions/communication.

The communication allows upstream and downstream signals/data/transmissions to be carried in assigned upstream and downstream channels. The upstream data is typically carried in frames encapsulated inside DOCSIS frames using a suitable modulation, such as quadrature amplitude modulation (QAM), quadrature phase shift keying (QPSK), and the like. The modulation order, in one example, is 4096 QAM or 16384 QAM, however it is appreciated that other suitable modulation orders can be used. The downstream data is also typically carried in frames encapsulated inside DOCSIS frames using a suitable modulation, such as quadrature amplitude modulation (QAM), quadrature phase shift keying (QPSK), and the like. The modulation order, in one example, is 4096 QAM or 16384 QAM, however it is appreciated that other suitable modulation orders can be used.

The method 500 can be repeated periodically, dynamically, as needed, at provisioning, and the like.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

While the apparatus has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is a cable modem system for discovering interference groups (IGs). The system comprises an infrastructure and a cable modem termination system (CMTS). The infrastructure is for transferring data. The CMTS is configured to initiate generation of test signals by a set of cable modems (CMs), obtain a set of test measurements for the set of CMs, discover interference groups (IGs) of the set of CMs based on the obtained set of test measurements and assign a plurality of upstream and downstream channels for the set of CMs that use orthogonal frequency division multiplexing (OFDM) based on the discovered IGs.

Example 2 is system including the subject matter of example 1, including or omitting optional elements, where the set of CMs is coupled to the infrastructure.

Example 3 is system including the subject matter of any of examples 1-2, including or omitting optional elements, where each CM of the set of CMs is configured to generate a CM test signal and one or more measuring CMs of the set of CMs measure a strength of the generated CM test signal and transmit the measured strength to the CMTS.

Example 4 is system including the subject matter of any of examples 1-3, including or omitting optional elements, where the set of CMs is served by the CMTS.

Example 5 is system including the subject matter of any of examples 1-4, including or omitting optional elements, where the infrastructure comprises hybrid fibre coax (HFC).

Example 6 is system including the subject matter of any of examples 1-5, including or omitting optional elements, where the set of CMs are configured to generate the CM test signals using a frequency offset and an N point inverse fast Fourier transform (IFFT).

Example 7 is system including the subject matter of any of examples 1-6, including or omitting optional elements, where the frequency offset is substantially smaller than a subcarrier spacing.

Example 8 is system including the subject matter of any of examples 1-7, including or omitting optional elements, where only a subset of subcarriers is/are utilized to generate the CM test signals.

Example 9 is system including the subject matter of any of examples 1-8, including or omitting optional elements, where the CMTS is configured to select each of the CMs in the set of CMs as a CM under test and obtain a plurality of measurements from measuring CMs of the set of CMs.

Example 10 is system including the subject matter of any of examples 1-9, including or omitting optional elements, where the CMTS is configured to schedule transmissions for the set of CMs based on the discovered IGs to mitigate interference of upstream transmissions by downstream transmissions.

Example 11 is system including the subject matter of any of examples 1-10, including or omitting optional elements, where the CMTS includes a remote physical device (RPD).

Example 12 is a cable modem for discovering interference groups (IGs). The modem comprises control circuitry and a transceiver. The control circuitry configured to generate a CM test signal in response to an assignment from a cable modem termination system (CMTS), wherein the CM test signal is generated as an upstream orthogonal frequency division multiplexing (OFDM) signal. The transceiver is configured to transmit the CM test signal to a plurality of measuring CMs.

Example 13 is a modem including the subject matter of example 12, including or omitting optional elements, where the control circuitry is configured to measure a test signal from another CM and provide the measurement to the CMTS.

Example 14 is system including the subject matter of any of examples 12-13, including or omitting optional elements, where the test signal includes a frequency offset that is substantially smaller than a subcarrier spacing.

Example 15 is system including the subject matter of any of examples 12-14, including or omitting optional elements, where the control circuitry is further configured to measure a pilot signal and compare the pilot signal with the measured test signal from another CM.

Example 16 is system including the subject matter of any of examples 12-15, including or omitting optional elements, where the control circuitry is configured to replace tones in an upstream orthogonal frequency division multiplexing (OFDM) signal with continuous wave tones to generate the test signal.

Example 17 is system including the subject matter of any of examples 12-16, including or omitting optional elements, where the CM is assigned an interference group (IG) based on the generated CM test signal.

Example 18 is a method for discovering interference groups (IGs) for a cable modem (CM) system. The method includes obtaining a set of test measurements for a set of cable modems (CMs), partitioning the set of CMs into one or more interference groups (IGs) based on the obtained set of test measurements, and scheduling transmissions for the set of CMs based on the one or more IGs.

Example 19 is system including the subject matter of example 18, including or omitting optional elements, further comprising causing each CM of the set of CMs to generate a CM test signal using orthogonal frequency division multiplexing (OFDM) upstream signals.

Example 20 is system including the subject matter of any of examples 18-19, including or omitting optional elements, where the one or more IGs each include CMs that interfere with each other.

Example 21 is a cable modem system for discovering interference groups (IGs). The system comprises a means for generating test signals for a set of cable modems (CMs), a means for obtaining a set of test measurements for the set of CMs based on the generated test signals, and a means for partitioning the set of CMs into one or more interference groups (IGs) based on the obtained set of test measurements.

Example 22 is system including the subject matter of example 21, including or omitting optional elements, further comprising a means for assigning upstream and downstream channels based on the one or more IGs.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

The invention claimed is:

1. A cable modem apparatus for discovering interference groups (IGs), the apparatus comprising:
an infrastructure for transferring data; and a cable modem termination system (CMTS) coupled to the infrastructure and configured to:
  initiate generation of test signals by a set of cable modems (CMs);
  obtain a set of test measurements for the set CMs, wherein one or more measuring CMs of the set of CMs measure the generated test signals to obtain the set of test measurements;
  discover interference groups (IGs) of the set of CMs based on the obtained set of test measurements; and
  assign a plurality of upstream and downstream channels for the set of CMs that use orthogonal frequency division multiplexing (OFDM) based on the discovered IGs,
wherein the set of CMs are configured to generate the CM test signals using a frequency offset and an N point inverse fast Fourier transform (IFFT).

2. The apparatus of claim 1, wherein the set CMs is coupled to the infrastructure.

3. The apparatus of claim 1, wherein each CM of the set of CMs is configured to generate a CM test signal and the one or more measuring CMs of the set of CMs transmit the set of test measurements to the CMTS.

4. The apparatus of claim 1, wherein the set of CMs is served by the CMTS.

5. The apparatus of claim 1, wherein the infrastructure comprises hybrid fibre coax (HFC).

6. The apparatus of claim 1, wherein the frequency offset is substantially smaller than a subcarrier spacing.

7. The apparatus of claim 1, wherein only a subset of subcarriers is utilized to generate the CM test signals.

8. The apparatus of claim 1, wherein the CMTS is configured to select each of the CMs in the set of CMs as a CM under test and obtain a plurality of measurements from measuring CMs of the set of CMs.

9. The apparatus of claim 1, wherein the CMTS is configured to schedule transmissions for the set of CMs based on the discovered IGs to mitigate interference of upstream transmissions by downstream transmissions.

10. The apparatus of claim 1, wherein the CMTS includes a remote physical device (RPD).

11. A cable modem apparatus for discovering interference groups (IGs), the system comprising:
  an infrastructure for transferring data; and
  a cable modem termination system (CMTS) coupled to the infrastructure and configured to:
    initiate generation of test signals by a set of cable modems (CMs);
    obtain a set of test measurements for the set CMs, wherein one or more measuring CMs of the set of CMs measure the generated test signals to obtain the set of test measurements;
    discover interference groups (IGs) of the set of CMs based on the obtained set of test measurements; and
    assign a plurality of upstream and downstream channels for the set of CMs that use orthogonal frequency division multiplexing (OFDM) based on the discovered IGs,
  wherein a CM of the set of CMs comprises a signal generation arrangement configured to generate a test signal of the generated test signals, the signal generation arrangement comprising:
    a sequence generator configured to generate an inverse fast Fourier transform (IFFT) sequence based on a vector; and
    a mixer configured to combine the IFFT sequence with a complex phasor term to generate the test signal, where the complex phasor term is based on a frequency shift.

12. The apparatus of claim 1, wherein the IGs include CMs that cause interference with each other.

13. The apparatus of claim 1, wherein the plurality of upstream and downstream channels include one or more full duplex (FDX) channels.

14. The apparatus of claim 1, wherein the infrastructure comprises a hybrid fiber coax (HFC).

* * * * *